US012060026B2

(12) United States Patent
Zhang et al.

(10) Patent No.: US 12,060,026 B2
(45) Date of Patent: Aug. 13, 2024

(54) LIFTING LUG FOR AIRBAG, AND AIRBAG

(71) Applicant: Autoliv Development AB, Vargarda (SE)

(72) Inventors: Dengyang Zhang, Jiangsu (CN); Dongjun Li, Shanghai (CN); Jiao Wen, Jiangsu (CN); Pengfei Guo, Jiangsu (CN)

(73) Assignee: Autoliv Development AB, Vargarda (SE)

( * ) Notice: Subject to any disclaimer, the term of this patent is extended or adjusted under 35 U.S.C. 154(b) by 31 days.

(21) Appl. No.: 18/001,819

(22) PCT Filed: Mar. 19, 2021

(86) PCT No.: PCT/CN2021/081751
§ 371 (c)(1),
(2) Date: May 22, 2023

(87) PCT Pub. No.: WO2021/253901
PCT Pub. Date: Dec. 23, 2021

(65) Prior Publication Data
US 2023/0294632 A1    Sep. 21, 2023

(30) Foreign Application Priority Data

Jun. 19, 2020 (CN) .......................... 202021158672.2

(51) Int. Cl.
*B60R 21/232* (2011.01)
*B60R 21/20* (2011.01)

(52) U.S. Cl.
CPC ............ *B60R 21/232* (2013.01); *B60R 21/20* (2013.01)

(58) Field of Classification Search
CPC ...... B60R 21/20; B60R 21/213; B60R 21/232
See application file for complete search history.

(56) References Cited

U.S. PATENT DOCUMENTS

| 6,889,999 B2 * | 5/2005 | Dominissini | B60R 21/213 |
| | | | 280/730.2 |
| 7,125,037 B2 * | 10/2006 | Tallerico | B60R 21/201 |
| | | | 280/730.2 |

(Continued)

FOREIGN PATENT DOCUMENTS

| CN | 102248929 A | 11/2011 |
| CN | 206623808 U | 11/2017 |

(Continued)

*Primary Examiner* — Laura Freedman
(74) *Attorney, Agent, or Firm* — Harness, Dickey & Pierce, P.L.C.; Stephen T. Olson

(57) ABSTRACT

A hanging lug for a safety airbag includes a first sewing piece, a second sewing piece, and a connecting piece. The first sewing piece and the second sewing piece are respectively provided at two ends of the connecting piece. The connecting piece is used for passing through a slit of a metal member. The connecting piece is folded in half after passing through the metal member. The first sewing piece and the second sewing piece are arranged in a staggered manner. Also provided is a safety airbag. The connecting piece is folded in half after passing through the metal member, and the first sewing piece and the second sewing piece are arranged in a staggered manner, thereby increasing the total sewing line length of the hanging lug, preventing an OPW from being damaged, reducing the number of sewn layers, and facilitating sewing operation.

13 Claims, 3 Drawing Sheets

(56) References Cited

U.S. PATENT DOCUMENTS

| | | | | |
|---|---|---|---|---|
| 7,328,911 B2* | 2/2008 | Chapman | | B60R 21/217 |
| | | | | 280/730.2 |
| 7,980,585 B2* | 7/2011 | Cheal | | B60R 21/201 |
| | | | | 280/730.2 |
| 8,056,924 B2* | 11/2011 | Hatfield | | B60R 21/213 |
| | | | | 280/730.2 |
| 8,091,918 B2* | 1/2012 | Mitchell | | B60R 21/201 |
| | | | | 280/730.2 |
| 8,136,833 B2* | 3/2012 | Baumgartner | | B60R 21/213 |
| | | | | 24/458 |
| 8,240,701 B2* | 8/2012 | Cheal | | B60R 21/201 |
| | | | | 280/730.2 |
| 8,505,961 B2* | 8/2013 | Jakobsson | | B60R 21/232 |
| | | | | 280/730.2 |
| 8,562,016 B2* | 10/2013 | Higano | | B60R 21/213 |
| | | | | 280/730.2 |
| 9,150,184 B2* | 10/2015 | Volkmann | | B60R 21/232 |
| 9,487,175 B2* | 11/2016 | Noma | | B60R 21/214 |
| 11,130,464 B2* | 9/2021 | Dinsdale | | B60R 21/232 |
| 11,130,466 B2* | 9/2021 | McKeon | | B60R 21/232 |
| 11,267,422 B2* | 3/2022 | Schmid | | B60R 21/213 |
| 11,603,065 B2* | 3/2023 | Callewaert | | B60R 21/20 |
| 11,634,097 B2* | 4/2023 | Kim | | B60R 21/232 |
| | | | | 280/728.2 |
| 11,745,690 B2* | 9/2023 | Kim | | B60R 21/232 |
| | | | | 280/728.2 |
| 11,745,691 B2* | 9/2023 | Kim | | B60R 21/213 |
| | | | | 280/728.2 |

FOREIGN PATENT DOCUMENTS

| | | |
|---|---|---|
| CN | 207257589 U | 4/2018 |
| CN | 212604972 U | 2/2021 |
| JP | 2014184792 A | 10/2014 |
| JP | 2018176863 A | 11/2018 |

* cited by examiner

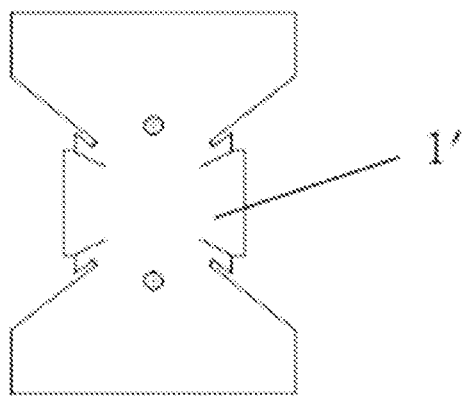
FIG. 1 - PRIOR ART
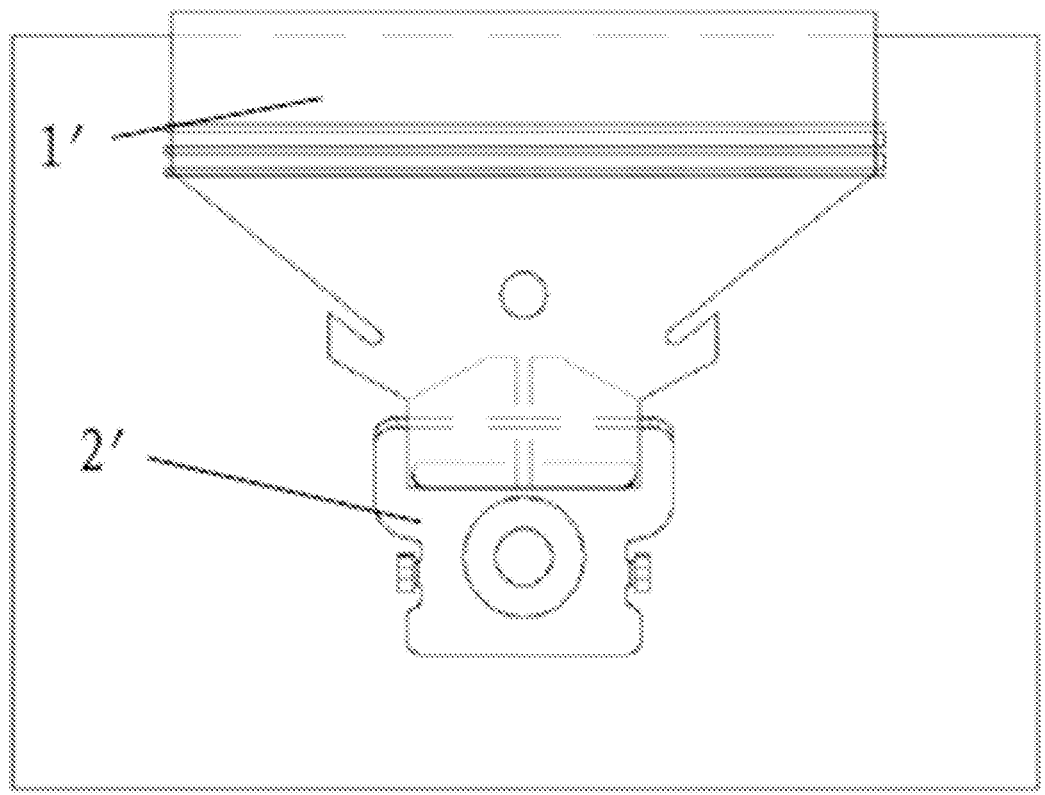
FIG. 2 - PRIOR ART

LIFTING LUG FOR AIRBAG, AND AIRBAG

TECHNICAL FIELD

The present invention relates to the technical field of safety airbags, and in particular to a hanging lug for a safety airbag and a safety airbag.

BACKGROUND

The existing complex design of a hanging lug is used for preventing a one piece woven (OPW) or a wiring piece from breaking. However, the existing design makes it extremely difficult to achieve automation, and requires a large amount of operating time.

Specifically, as shown in FIGS. 1 and 2, an existing hanging lug 1' requires a sufficient sewing line length to prevent an OPW from being damaged. However, the overly large length makes it extremely difficult for the hanging lug to pass through a slit on a metal member 2'.

In addition, the hanging lug 1' needs to be folded to increase the thickness so as to prevent the metal member 2' from wearing away the hanging lug. However, this requires more operating time. In addition, if folding results in too many layers, sewing is extremely difficult.

Therefore, it is necessary to design a hanging lug, which allows for automation, prevents an OPW from being damaged, and can pass through a metal member easily and be sewn easily, for a safety airbag and a safety airbag.

SUMMARY

The objective of the present invention is to overcome the disadvantages of the prior art, and provide a hanging lug, which allows for automation, prevents an OPW from being damaged, and can pass through a metal member easily and be sewn easily, for a safety airbag and a safety airbag.

Provided in the technical solution of the present invention is a hanging lug for a safety airbag, comprising a first sewing piece, a second sewing piece, and a connecting piece, the first sewing piece and the second sewing piece being respectively provided at two ends of the connecting piece, the connecting piece being used for passing through a slit of a metal member, the connecting piece being folded in half after passing through the metal member, and the first sewing piece and the second sewing piece being arranged in a staggered manner.

Further, the first sewing piece and the second sewing piece are combined side by side, the first sewing piece has a sewing line length of L1, the second sewing piece has a sewing line length of L2, and the hanging lug has a total sewing line length of L=L1+L2.

Further, the connecting piece is strip-shaped after being unfolded, and is V-shaped after being folded in half.

Further, two side edges of the connecting piece are provided with opposite protruding portions, and the two protruding portions are staggered in a lengthwise direction, so that after the connecting piece passes through the metal member, the two protruding portions are respectively fastened on front and rear sides of the slit.

Further, the first sewing piece and the second sewing piece have the same shape, or the area of one of the first sewing piece and the second sewing piece is smaller than that of the other.

Further, the first sewing piece, the second sewing piece, and the connecting piece are made of a single piece of woven fabric.

Further, the hanging lug is made by fusing six to ten layers of woven fabric.

Further provided in the present invention is a safety airbag, comprising a gas bag and a metal member, and further comprising the hanging lug for a safety airbag according to any one described above, the connecting piece being folded in half after passing through the metal member, and the first sewing piece, the second sewing piece, and the gas bag being sewn together.

Further, the safety airbag is a fully inflatable curtain safety airbag.

The above technical solution can achieve the following beneficial effects:

In the present invention, the connecting piece is folded in half after passing through the metal member, and the first sewing piece and the second sewing piece are arranged in a staggered manner, thereby increasing the total sewing line length of the hanging lug, preventing an OPW from being damaged, reducing the number of sewn layers, and facilitating sewing operation. In addition, the total sewing line length meets requirements, so that the first sewing piece and the second sewing piece do not need to be overly wide, and can easily pass through the slit of the metal member, thereby achieving automated operation.

BRIEF DESCRIPTION OF THE DRAWINGS

The disclosure of the present invention will become better understood with reference to the accompanying drawings. It should be understood that these drawings are for illustrative purposes only and are not intended to limit the scope of protection of the present invention. In the drawings:

FIG. 1 is a diagram of an unfolded state of an existing hanging lug;

FIG. 2 is a diagram of a mounted state of an existing hanging lug;

Figure 3:
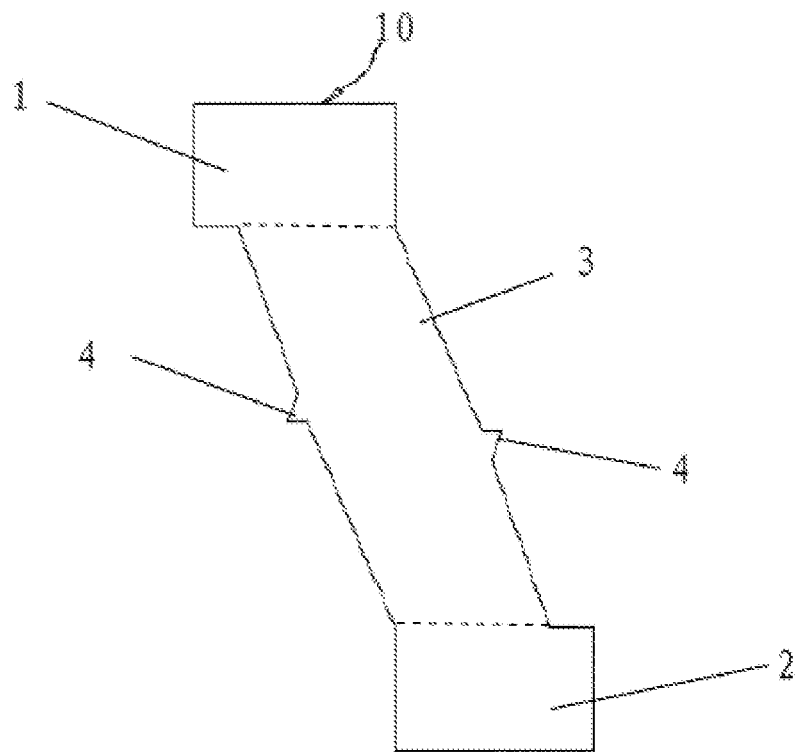
FIG. 3 is a diagram of an unfolded state of a hanging lug according to Embodiment 1 of the present invention.
Figure 4:
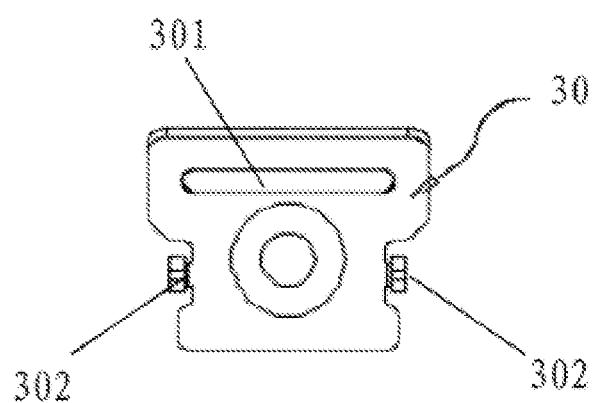
FIG. 4 is a schematic diagram of a metal piece.

REFERENCE NUMERALS hanging lug 1', and metal member 2';
hanging lug 10, gas bag 20, metal member 30, slit 301, and hook 302;
first sewing piece 1, second sewing piece 2, connecting piece 3, and protruding portion 4.

DETAILED DESCRIPTION

Specific embodiments of the present invention are described further below with reference to the accompanying drawings.

It may be easily understood that those of ordinary skills in the art may propose a plurality of interchangeable structural modes and implementation methods according to the technical solutions of the present invention without changing the essential spirit of the present invention. Therefore, the following specific embodiments and the accompanying drawings are merely exemplary description of the technical solutions of the present invention, and should not be regarded as the whole of the present invention or regarded as limitations to the technical solutions of the present invention.

The positional terms of up, down, left, right, before, behind, front, back, top, bottom, etc. which are referred to or possibly referred to in this specification are defined with respect to the configurations shown in the drawings, and they are relative concepts; therefore, they may possibly change correspondingly according to different positions thereof and different use states. Therefore, these or other positional terms should not be construed as restrictive terms.

Embodiment 1

As shown in FIG. 3, a hanging lug 10 for a safety airbag includes a first sewing piece 1, a second sewing piece 2, and a connecting piece 3. The first sewing piece 1 and the second sewing piece 2 are respectively provided at two ends of the connecting piece 3.

The connecting piece 3 is used for passing through a slit 301 of a metal member 30. The connecting piece 3 is folded in half after passing through the metal member 30, and the first sewing piece 1 and the second sewing piece 2 are arranged in a staggered manner.

Specifically, the hanging lug 10 is narrow and long in shape, and particularly, the connecting piece 3 is strip-shaped when unfolded. As shown in FIG. 3, dashed lines are demarcation lines between the connecting piece 3 and the first sewing piece 1 and the second sewing piece 2. In this embodiment, the hanging lug is an integral structure. No actual boundary is present between the connecting piece 3 and the first sewing piece 1 and the second sewing piece 2, and the dotted lines are only for facilitating differentiation.

Figure 5:
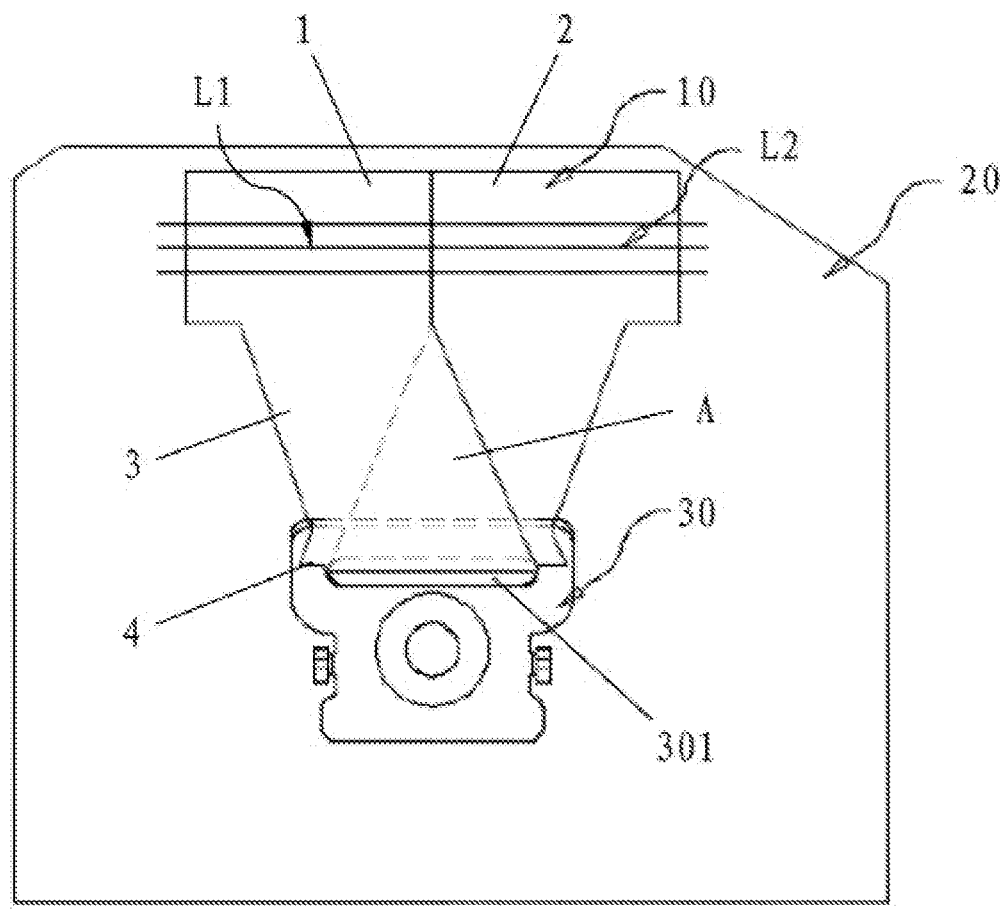
FIG. 5 is a schematic diagram of a safety airbag according to Embodiment 2 of the present invention.

Both the first sewing piece 1 and the second sewing piece 2 are rectangular pieces. The connecting piece 3 is a parallelogram. The first sewing piece 1 and the second sewing piece 2 are respectively connected to upper and lower side edges of the connecting piece 3. As shown in FIG. 5, when mounting the connecting piece 3 and the metal member 30, the first sewing piece 1 or the second sewing piece 2 needs to pass through the slit 301. For example, the first sewing piece 1 passes through the slit 301, and then the first sewing piece 1 drives the connecting piece 3 to pass through the slit 301 together. After a middle portion of the connecting piece 3 enters the slit 301, the connecting piece 3 is folded in half, so that after folded upwards, the second sewing piece 2 and the first sewing piece 1 are arranged in a staggered manner. That is, the first sewing piece 1 and the second sewing piece 2 do not overlap with each other.

In FIG. 5, the first sewing piece 1 has a sewing line length of L1, and the second sewing piece 2 has a sewing line length of L2. The hanging lug 10 has a total sewing line length of L=L1+L2.

The first sewing piece 1 and the second sewing piece 2 are arranged in a staggered manner, thereby increasing the total sewing line length L of the hanging lug 10, preventing an OPW from being damaged, reducing the number of sewn layers, and facilitating sewing operation. For example, the number of layers of the hanging lug 10 in Embodiment 1 is three, and the number of sewn layers of sewing the first sewing piece 1 and the second sewing piece 2 to a gas bag 20 along L1 and L2 is also three.

However, for a hanging lug 1' in the prior art, folding the hanging lug 1' in half results in entire overlapping, so that when the number of layers of the hanging lug 1' is three, the number of sewn layers after the folding is six, thereby increasing the difficulty of sewing.

In addition, the total sewing line length L meets requirements, so that the first sewing piece 1 and the second sewing piece 2 do not need to be overly wide, and can easily pass through the slit 301 of the metal member 30, thereby achieving automated operation.

For example, for the existing hanging lug 1', in order to prevent an OPW or a wiring piece from breaking, the sewing line length L needs to be set. However, if the length L is greater than the width of the slit 301, then it is extremely difficult to pass through the slit 301.

In Embodiment 1, L1 and L2 of the hanging lug 10 are one half of L, and the length of the first sewing piece 1 and the length of the second sewing piece 2 are reduced, so that the first sewing piece 1 and the second sewing piece 2 can pass through the slit 301 smoothly.

As shown in FIG. 5, in this embodiment, after the connecting piece 3 is folded in half, an overlapping region A is still present in a position where the connecting piece 3 contacts the metal member 30, so that the connecting piece 3 has the sufficient thickness, thereby preventing the metal member 30 from wearing away the hanging lug 10.

Further, as shown in FIG. 5, the first sewing piece 1 and the second sewing piece 2 are combined side by side. A right side edge of the first sewing piece 1 aligns with a left side edge of the second sewing piece 2.

Optionally, the first sewing piece 1 and the second sewing piece 2 are arranged side by side, but the first sewing piece 1 and the second sewing piece 2 may be spaced apart from each other by a small distance.

Further, as shown in FIG. 3 and FIG. 5, the connecting piece 3 is strip-shaped after being unfolded, and is V-shaped after being folded in half.

The width of the strip-shaped connecting piece 3 is relatively small, so that the connecting piece 3 can smoothly pass through the slit 301 of the metal member 30. The connecting piece 3 is V-shaped after being folded in half. The connecting piece 3 overlaps partially in a center region of folding, and the two ends of the connecting piece 3 are staggered, so that the first sewing piece 1 and the second sewing piece 2 are arranged side by side.

Further, as shown in FIG. 3, two side edges of the connecting piece 3 are provided with opposite protruding portions 4, and the two protruding portions 4 are staggered in a lengthwise direction, so that after the connecting piece 3 passes through the metal member 30, the two protruding portions 4 are respectively fastened on front and rear sides of the slit 301.

Specifically, the protruding portion 4 is in the shape of a small triangle. The two protruding portions 4 are respectively on left and right lengthwise edges of the connecting piece 3, and are staggered in the lengthwise direction.

When the connecting piece 3 pass through the slit 301, one of the protruding portions 4 also passes through the slit 301, and then the connecting piece 3 is folded in half. The width of the protruding portion 4 plus the width of the connecting piece 3 is greater than the width of the slit 301, so that the protruding portion 4 needs to deform slightly in order to pass through the slit 301.

As shown in FIG. 5, after the connecting piece 3 is folded in half, the two protruding portions 4 are respectively fastened to front and rear side surfaces of the metal member 30, so that the connecting piece 3 folded in half does not move easily when pulled, and is kept in a relatively stable state with respect to the metal member 30.

In Embodiment 1, the first sewing piece 1 and the second sewing piece 2 have the same shape.

Alternatively, the first sewing piece 1 and the second sewing piece 2 may have different shapes. The sewing piece that needs to pass through the slit 301 may have the smaller width, i.e., the smaller sewing line length, and the folded sewing piece may have the greater width, i.e., the greater sewing line length.

Further, the first sewing piece 1, the second sewing piece 2, and the connecting piece 3 are made of a single piece of woven fabric.

Alternatively, the hanging lug 10 is made by fusing six to ten layers of woven fabric.

In this embodiment, the first sewing piece 1, the second sewing piece 2, and the connecting piece 3 pass through the slit 301 easily, so that the number of layers of the hanging lug 10 may be increased to increase connection strength of the hanging lug 10.

Embodiment 2

As shown in FIG. 5, a safety airbag includes a gas bag 20 and a metal member 30, and further includes the hanging lug 10 for a safety airbag according to Embodiment 1 and variants thereof. The connecting piece 3 is folded in half after passing through the metal member 30. The first sewing piece 1, the second sewing piece 2, and the gas bag 20 are sewn together.

The metal member 30 is for being connected to a safety airbag housing. After the metal member 30 is connected to the gas bag 20 by means of the hanging lug 10, the gas bag 20 is hung in the safety airbag housing.

The metal member 30 may be a metal sheet. The metal member 30 is provided with the slit 301, and is further provided with a hook 302.

A mounting process of the hanging lug 10 is as follows:
first, causing one of the sewing pieces (the first sewing piece 1 or the second sewing piece 2) of the hanging lug 10 to pass through the slit 301 of the metal member 30;
then, pulling the sewing piece to cause the connecting piece 3 to also pass through the slit 301;
after one of the protruding portions 4 passes through the slit 301, folding the connecting piece 3 in half, and arranging the first sewing piece 1 and the second sewing piece 2 side by side;
and finally, sewing the first sewing piece 1, the second sewing piece 2, and the gas bag 20 to complete connection.

Preferably, the safety airbag is a fully inflatable curtain safety airbag.

Alternatively, the safety airbag may also be another gas bag that needs a hanging lug.

Implementing this embodiment can achieve automation, prevent an OPW from being damaged, allow a metal member to be passed through easily, and allow sewing to be performed easily. In addition, connection strength between the hanging lug and the gas bag is increased, and tearing and dropping are not prone to occur.

The above description is merely illustrative of the principles and preferred examples of the present invention. It should be noted that other variations can be made by those of ordinary skill in the art on the basis of the principles of the present invention, and such variations should be construed as falling within the scope of protection of the present invention.

The invention claimed is:

1. A hanging lug for a safety airbag, the hanging lug comprising:
a first sewing piece;
a second sewing piece; and
a connecting piece, the first sewing piece and the second sewing piece being respectively provided at two ends of the connecting piece,
the connecting piece being used for passing through a slit of a metal member, the connecting piece being folded in half after passing through the metal member, and the first sewing piece and the second sewing piece being arranged in a staggered manner,
wherein the first sewing piece and the second sewing piece are combined side by side, the first sewing piece has a sewing line length of L1, the second sewing piece has a sewing line length of L2, and the hanging lug has a total sewing line length of L=L1+L2.

2. The hanging lug for the safety airbag according to claim 1, wherein the first sewing piece and the second sewing piece have the same shape, or the area of one of the first sewing piece and the second sewing piece is smaller than that of the other.

3. The hanging lug for the safety airbag according to claim 1, wherein the first sewing piece, the second sewing piece, and the connecting piece are made of a single piece of woven fabric.

4. A hanging lug for a safety airbag, the hanging lug comprising:
a first sewing piece;
a second sewing piece; and
a connecting piece, the first sewing piece and the second sewing piece being respectively provided at two ends of the connecting piece, the connecting piece being used for passing through a slit of a metal member, the connecting piece being folded in half after passing through the metal member, and the first sewing piece and the second sewing piece being arranged in a staggered manner,
wherein the connecting piece is strip-shaped after being unfolded, and is V-shaped after being folded in half.

5. The hanging lug for the safety airbag according to claim 4, wherein two side edges of the connecting piece are provided with opposite protruding portions, and the two protruding portions are staggered in a lengthwise direction, so that after the connecting piece passes through the metal member, the two protruding portions are respectively fastened on front and rear sides of the slit.

6. A safety airbag, comprising:
a gas bag;
a metal member; and
a hanging lug including a first sewing piece;
a second sewing piece; and
a connecting piece, the first sewing piece and the second sewing piece being respectively provided at two ends of the connecting piece, the connecting piece being used for passing through a slit of a metal member, the connecting piece being folded in half after passing through the metal member, and the first sewing piece and the second sewing piece being arranged in a staggered manner,
wherein the connecting piece is in half after passing through the metal member, and the first sewing piece, the second sewing piece, and the gas bag are sewn together.

7. The safety airbag according to claim 6, wherein the safety airbag is a fully inflatable curtain safety airbag.

8. The safety airbag according to claim 6, wherein the first sewing piece and the second sewing piece are combined side by side, the first sewing piece has a sewing line length of L1, the second sewing piece has a sewing line length of L2, and the hanging lug has a total sewing line length of L=L1+L2.

9. The safety airbag according to claim 6, wherein the connecting piece is strip-shaped after being unfolded, and is V-shaped after being folded in half.

10. The safety airbag according to claim 9, wherein two side edges of the connecting piece are provided with opposite protruding portions, and the two protruding portions are staggered in a lengthwise direction, so that after the connecting piece passes through the metal member, the two protruding portions are respectively fastened on front and rear sides of the slit.

11. The safety airbag according to claim 6, wherein the first sewing piece and the second sewing piece have the same shape, or the area of one of the first sewing piece and the second sewing piece is smaller than that of the other.

12. The safety airbag according to claim 6, wherein the first sewing piece, the second sewing piece, and the connecting piece are made of a single piece of woven fabric.

13. The safety airbag according to claim 12, wherein the hanging lug is made by fusing six to ten layers of woven fabric.

\* \* \* \* \*